United States Patent
Yang (10) Patent No.: US 10,178,592 B2
(45) Date of Patent: Jan. 8, 2019

(54) EVALUATION RESULT SUBMISSION METHOD, EVALUATION RESULT ACQUISITION METHOD, DEVICE, AND SYSTEM

(71) Applicant: ZTE CORPORATION, Shenzhen, Guangdong Province (CN)

(72) Inventor: Li Yang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 80 days.

(21) Appl. No.: 15/310,790

(22) PCT Filed: Jan. 21, 2015

(86) PCT No.: PCT/CN2015/071250
§ 371 (c)(1),
(2) Date: Nov. 14, 2016

(87) PCT Pub. No.: WO2015/172580
PCT Pub. Date: Nov. 19, 2015

(65) Prior Publication Data
US 2017/0094572 A1    Mar. 30, 2017

(30) Foreign Application Priority Data
May 15, 2014    (CN) .......................... 2014 1 0206045

(51) Int. Cl.
*H04W 36/14*    (2009.01)
*H04W 76/04*    (2009.01)
(Continued)

(52) U.S. Cl.
CPC ........... *H04W 36/14* (2013.01); *H04W 76/27* (2018.02); *H04W 84/12* (2013.01); *H04W 88/06* (2013.01); *H04W 88/08* (2013.01)

(58) Field of Classification Search
CPC ..... H04W 36/14; H04W 88/06; H04W 76/27; H04W 84/12; H04W 88/08; H04W 76/046; H04W 76/04
(Continued)

(56) References Cited

U.S. PATENT DOCUMENTS 7,978,636 B2 * 7/2011 Gaur ..................... H04W 72/10
                                                          370/230
9,100,852 B2 * 8/2015 Xiang ............... H04W 28/0231
(Continued)

FOREIGN PATENT DOCUMENTS

CN    102892169 A    1/2013
CN    102958108 A    3/2013
(Continued)

OTHER PUBLICATIONS

Analysis Inter-frequency Measurement Requirements for HetNet Offloading, 3GPP TSG RAN WG4 Meeting #68bis Riga, Latvia, Oct. 7-11, 2013, R4-135206.

*Primary Examiner* — Man U Phan
(74) *Attorney, Agent, or Firm* — Ling Wu; Stephen Yang; Ling and Yang Intellectual Property (57) ABSTRACT

The present document disclosed an evaluation result reporting method and an evaluation result acquisition method, device and system. Herein, the evaluation result reporting method includes: UE performing an evaluation on a relation between throughputs of data transmission at a WLAN AP and a source serving cell (S402); and the UE reporting an evaluation result (S404). The present document solves the problem that a WLAN-side data flow offloading state and a situation of transmission experience of the UE cannot be obtained in a moving process of the UE in the related art. Thereby, the reasonable resource pre-configuration can be performed for the moving process of the UE, the resource
(Continued)

allocation and utilization efficiency are improved, and the user experience is enhanced.

10 Claims, 8 Drawing Sheets

(51) Int. Cl.
*H04W 76/27* (2018.01)
*H04W 88/06* (2009.01)
*H04W 84/12* (2009.01)
*H04W 88/08* (2009.01)

(58) Field of Classification Search
USPC .................................................. 370/252–338
See application file for complete search history.

(56) References Cited

U.S. PATENT DOCUMENTS

| | | | |
|---|---|---|---|
| 9,232,439 B2* | 1/2016 | Okhravi | H04L 43/0888 |
| 9,420,501 B2* | 8/2016 | Lei | H04W 36/38 |
| 9,578,586 B2* | 2/2017 | Frydman | H04W 40/00 |
| 9,706,423 B2* | 7/2017 | Horn | H04W 24/10 |
| 9,860,784 B2* | 1/2018 | Ozturk | H04L 5/001 |
| 2013/0308445 A1 | 11/2013 | Xiang et al. | |
| 2014/0022932 A1* | 1/2014 | Park | H04W 36/14 370/253 |
| 2014/0079022 A1* | 3/2014 | Wang | H04W 36/22 370/331 |
| 2014/0204927 A1* | 7/2014 | Horn | H04W 76/16 370/338 |

FOREIGN PATENT DOCUMENTS

| | | |
|---|---|---|
| CN | 103582062 A | 2/2014 |
| EP | 2741544 A1 | 6/2014 |
| WO | 2011123839 A1 | 10/2011 |
| WO | WO2013138711 A1 | 9/2013 |

* cited by examiner

EVALUATION RESULT SUBMISSION METHOD, EVALUATION RESULT ACQUISITION METHOD, DEVICE, AND SYSTEM

TECHNICAL FIELD

The present document relates to the field of communication, in particular to an evaluation result reporting method and an evaluation result acquisition method, device and system.

BACKGROUND OF THE RELATED ART

With the continuous increase of the number of subscribers of mobile communication operators and amounts of services such as user voice data and so on, the infrastructure investment and deployment scale of mobile communication networks of the mobile communication operators must be correspondingly increased, and radio coverage and system capacity are continuously increased as well. By taking most mobile communication operators in Europe as an example, they successively deploy mobile communication systems (which belong to the 3GPP communication system family) of three different types of Radio Access Technology RAT systems, i.e., Global System of Mobile communication GSM, Universal Mobile Telecommunications System UMTS and Long Term Evolution LTE. In order to enhance various mobile communication functions and expand the system capacity, the above-mentioned three types of systems experience respective 3rd Generation Partnership 3GPP standardization technology evolution. In addition, the mobile communication operators widely deploy and use the Wireless Local Area Network WLAN system (which is evolving towards High Efficient WLAN HEW) in the IEEE communication system family as an efficient and low-cost capacity supplementation.

Figure 1:
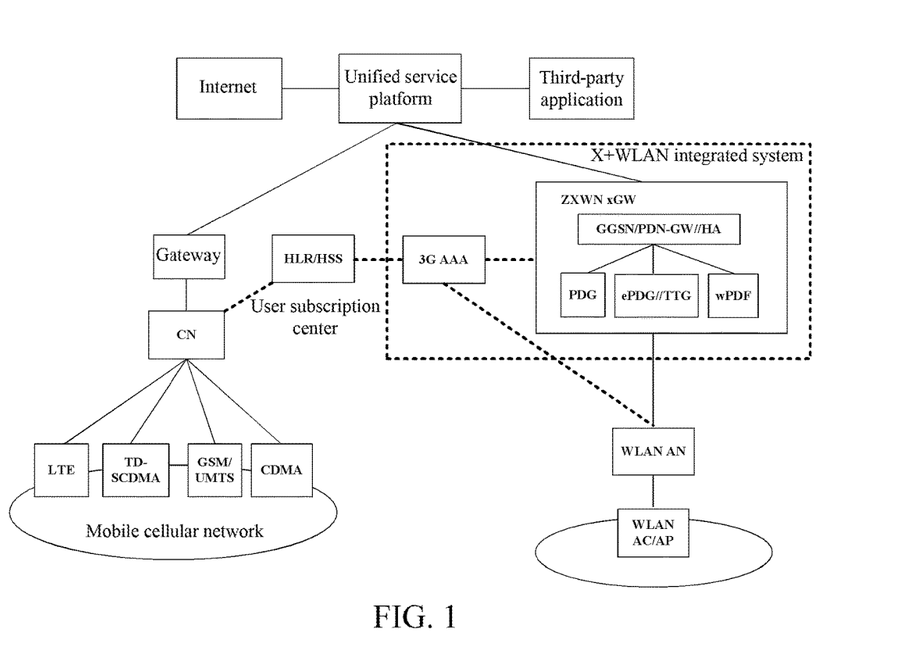
FIG. 1 illustrates a schematic diagram of a WLAN/3GPP interoperation coupling architecture in the related art.

Any one of the mobile communication systems basically consists of the following main logic network element nodes: User Equipment UE of a single-mode or multimode system/Stationary Access STA, Radio Access Network RAN/Access Point AP, Core Network CN, Operation and Maintenance Center OMC, Transport Bearer Network TBN, etc. For example, a network side of the UMTS consists of a core network unit, Mobile Switching Center MSC/Medial Gate-Way MGW/Serving GPRS Support Node SGSN/Gateway GPRS Support Node GGSN, and a radio access network unit, NodeB/Radio Network Controller RNC, and 3GPP standardized terrestrial interfaces Iu, Iub and Iur therebetween, and so on. A network side of the LTE system consists of a core network unit, Mobility Management Entity MME/Serving Gateway SGW/Packet Gateway PGW/IP Multimedia Subsystem IMS, and a radio access network unit, Evolved NodeB eNB, and terrestrial interfaces S1 and X1 therebetween, and so on. A network side of a WLAN system consists of an Access Controller AC and a radio access unit AP and so on. Since the above-mentioned various systems Multi-RAT are evolutionary, coexists and provides jointly service in the long term, in order to enhance the cross-system performance, enhance the user experience of mobile communication, reduce software and hardware costs and facilitate the management and operation maintenance performed by operators, system manufacturers often couple the above-mentioned various systems to different extents to form so-called cross-system interoperation or joint operation. FIG. 1 illustrates a schematic diagram of a WLAN/3GPP interoperation coupling architecture in the related art, and the joint operation is as illustrated by the architecture example in FIG. 1. That has the beneficial effects that different RATs can exert the advantageous features of respective systems, different RATs can evenly share the communication loads of vast users, different RATs can form resource, coverage and capacity complementation. Thus a high-performance communication Key Performance Indicator KPI can be provided for the entire large system, and better mobile communication Quality of Experience QOE can be brought to users.

Figure 2A:
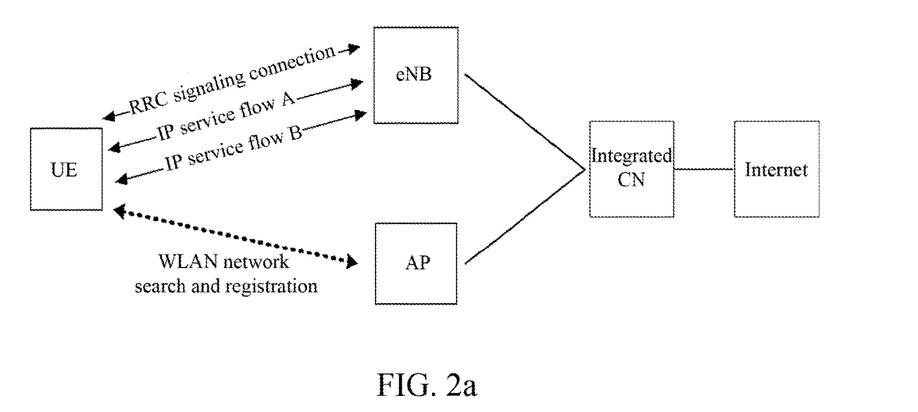
FIG. 2a illustrates a schematic diagram of a state before IP flow is offloaded to a WLAN network in the related art.
Figure 2B:
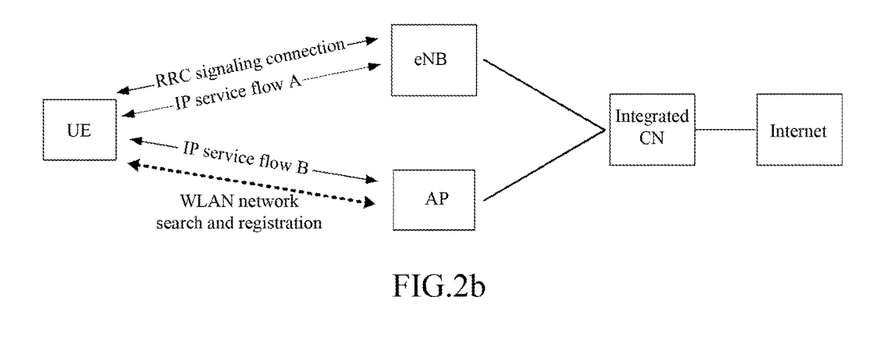
FIG. 2b illustrates a schematic diagram of a state after IP flow is offloaded to a WLAN network in the related art.

According to technologies which have already been disclosed and are discussing at current, a UE having a WLAN/3GPP multimode capability can be simultaneously in a state of communication connections with certain RAT networks in WLAN and 3GPP families. For example, a certain UE having a WLAN/LTE dual-mode capability is simultaneously under the coverage of radio signals of WLAN/LTE networks. The UE firstly establishes a Radio Resource Control RRC connection with the LTE network at a certain moment to perform a bidirectional communication of a certain IP service flow A, and thereafter a user initiates a new IP service flow B. In a user manual control mode, the UE searches for and finds WLAN coverage signals and completes necessary network access registration Attach (the process is called as WLAN network selection and registration). Then a CN which is integrated with various system core network functions may migrate the IP service flow B to the WLAN system to which the UE was successfully registered before according to certain policy and rule. Thereafter the IP service flow A of the UE is still born in the LTE network, and the IP service flow B is born in the WLAN network (the process is called as WLAN data flow offloading). FIG. 2a illustrates a schematic diagram of a state before an IP flow is offloaded to a WLAN network in the related art, FIG. 2b illustrates a schematic diagram of a state after an IP flow is offloaded to a WLAN network in the related art, and the above-mentioned processes are respectively as illustrated in FIG. 2a and FIG. 2b.

Figure 3A:
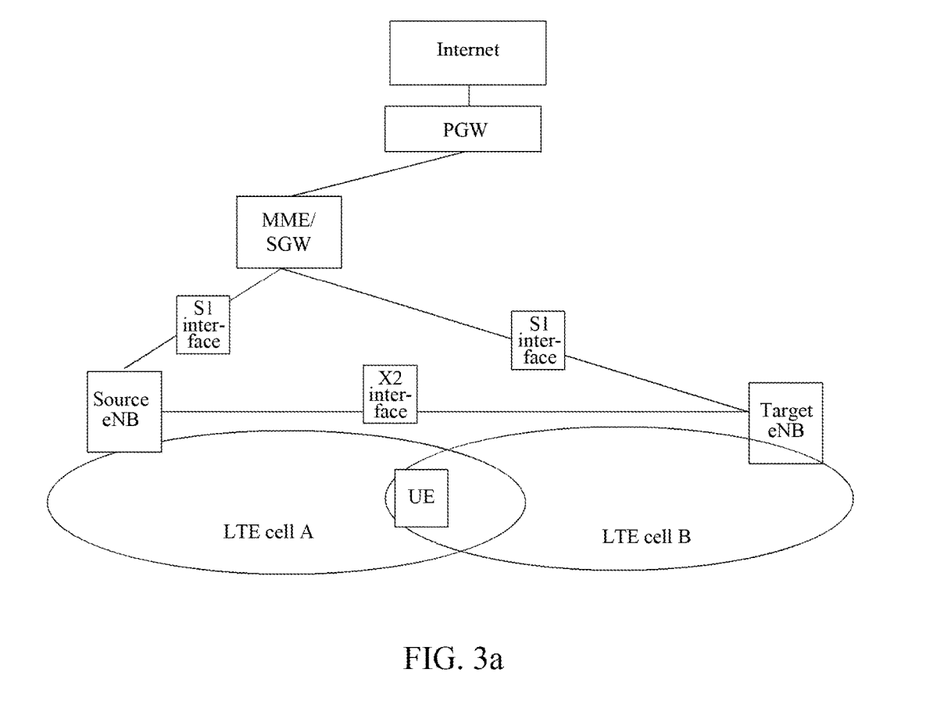
FIG. 3a illustrates a schematic diagram when UE moves between source/target LTE cells and there is no WLAN coverage or data flow offloading in the related art.
Figure 3B:
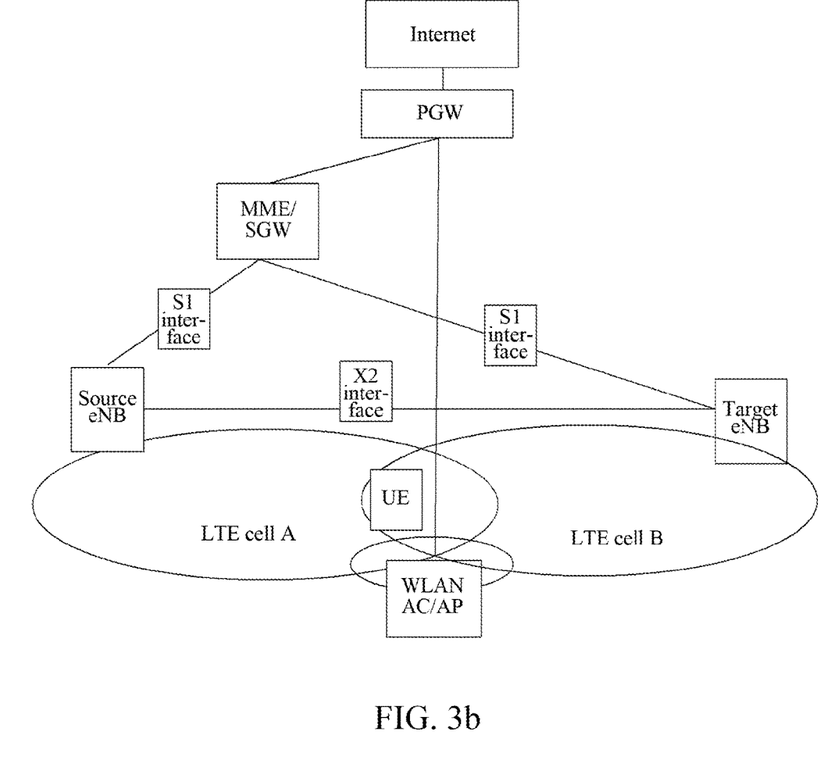
FIG. 3b illustrates a schematic diagram when UE moves between source/target LTE cells and there are WLAN coverage and data flow offloading in the related art.

In addition to WLAN network selection and data flow offloading between WLAN/3GPP, UE also simultaneously executes a mobility process in a 3GPP system according to the mobility feature in a physical space of the UE, e.g., reselection and handover of a serving cell. By taking cross-eNB handover of UE in the LTE system as an example (at the moment UE is in an RRC_Connected mode), FIG. 3a illustrates a schematic diagram when UE moves between source/target LTE cells and there is no WLAN coverage or data flow offloading in the related art. As illustrated in FIG. 3a, when the UE is located at the edge of an LTE cell A (since there is no coverage of any WLAN AP, no WLAN network selection and data flow offloading occur at all) and moves to an LTE cell B, a source eNB transfers a control right of RRC connection/E-RAB radio bearer to a target eNB according to a specific LTE mobile process. After a success is made, the LTE cell B will become a new serving cell of the UE. In a scenario which is a little more complex than the scenario illustrated in FIG. 3a, FIG. 3b illustrates a schematic diagram when UE moves between source/target LTE cells and there are WLAN coverage and data flow offloading in the related art. As illustrated in FIG. 3b, when the UE is located at the edge of an LTE cell A (since there is proper WLAN AP coverage, WLAN network selection and data flow offloading occur simultaneously) and moves to an LTE cell B, a source eNB also transfers a control right of RRC connection/E-RAB radio bearer to a target eNB according to a specific LTE mobile process. After a success is made, an LTE cell B will take over to become a new serving cell of the UE; and if at the moment the UE is still under the coverage of WLAN AP, WLAN network selection and data flow offloading may be continuously performed. As compared with the simpler scenario illustrated in FIG. 3a, in the scenario illustrated in FIG. 3b, since the UE is simultaneously in a WLAN data flow offloading state in a moving process in the 3GPP system, the source and target eNBs do not know the flow offloading state and the specific situation of the UE according to the current related art, and the following technical problems may be caused:

1. Since the target eNB does not know whether the UE is in the WLAN data flow offloading state before at all and does not know the situations of the volume and throughput of data transmitted at the WLAN side, in a process of making a handover preparation for the UE, more accurate resource reservation cannot be performed for the UE, and relative rough resource reservation may be performed only according to QOS related parameters of the UE such as the volume and throughput of the data transmitted in the source eNB. Consequently, if the UE successfully completes handover and the data at the WLAN side at first immediately flow back to LTE, the target eNB must perform additional allocation of resources again to serve for the transmission of the data which newly flow back. The two-time allocation process will increase the signaling overhead of an air interface and may interrupt or delay experience of some existing services to a certain extent.

2. Supposing that the target eNB always defaults that the UE is in the WLAN data flow offloading state and always performs additional resource reservation of a certain upper limit for the UE in the process of making a handover preparation for the UE. Once the data at the WLAN side actually flow back to LTE after the UE successfully completes handover, the target eNB can make the greatest effort to serve for the transmission of the data which flow back to a certain extent. However, if the UE originally is not in the WLAN data flow offloading state or no data backflow occurs after handover, the additional resource reservation performed by the target eNB is obviously useless and wasteful, which will cause some influences on normal services of other UE.

3. Since data transmission in the WLAN system is based on a mechanism of random competition between a plurality of users for radio resources, communication experience of each user, e.g., performance in aspects such as data transmission throughput, data packet delay and packet loss rate and so on cannot be guaranteed, and is usually and easily influenced by various objective conditions, and the UE can only make the greatest effort. For example, in the scenario illustrated in FIG. 3b, before handover, the average data transmission throughput of the IP service flow of the UE at the WLAN side may be relatively great or is in a trend of decrease, and after handover, due to the change of the radio condition, the UE is triggered to search for and reselect a network to load off the flow to another new WLAN which has heavier loads or is physically far away from the coverage of the old WLAN, and consequently the average data transmission throughput of the corresponding IP service flow becomes very small. If the target eNB can judge the situation of the change trend of the data transmission throughput of the UE at the WLAN side, it is possible to migrate all or partial IP service flow of the UE at the WLAN side back to the target cell B as soon as possible to maintain or improve the smooth experience of certain existing important services of the user.

The above-mentioned scenarios and problems may also be extended to cell reselection in the 3GPP system (at the moment the UE is in an RRC_Idle mode or there are additional Cell_FACH/PCH states and the like under the UMTS system), cross-system LTE<->UTMS inter-cell handover (at the moment the UE is in the RRC_Connected mode or in a corresponding Cell_DCH state under the UMTS), etc. In short, the target serving cell cannot know the WLAN-side data flow offloading state of the UE in the source serving cell and the specific situation of transmission experience in the moving process of the UE. Therefore, reasonable resource pre-configuration cannot be performed for the movement process, consequently the resource allocation and utilization efficiency in the 3GPP system is low; the existing services of the user may be released partly since the target cell takes over the control; the data transmission throughput fluctuates greatly and the consistency experience is relatively poor.

However, no effective solution has already been put forward aiming at the problem that the WLAN-side data flow offloading state of the UE and the situation of transmission experience cannot be obtained in the moving process of the UE in the related art.

SUMMARY

The embodiments of the present document provide an evaluation result reporting method and an evaluation result acquisition method, device and system, in order to at least solve the problem that a WLAN-side data flow offloading state of UE and a situation of transmission experience cannot be obtained in a moving process of the UE in the related art.

According to one embodiment of the present document, an evaluation result reporting method is provided. The method includes: User Equipment UE performing an evaluation on a relation between throughputs of data transmission at a Wireless Local Area Network WLAN Access Point AP and a source serving cell; and the UE reporting an evaluation result.

The UE performing an evaluation on a relation between throughputs of data transmission at a WLAN AP and a source serving cell includes: the UE performing an evaluation on a ratio of average throughputs of the data transmission at the WLAN AP and the source serving cell; and the UE performing an evaluation on a change trend of the average throughput of data transmission at the WLAN AP.

The UE performing an evaluation on a relation between throughputs of data transmission at a WLAN AP and a source serving cell includes: the UE receiving configuration information for monitoring a ratio of average throughputs of the data transmission and/or switch enabling information, which is sent by a source control entity of a Radio Access Network RAN or a Core Network CN through a downlink message; and the UE performing the evaluation on the relation between the throughputs of the data transmission at the WLAN AP and the source serving cell according to the configuration information and/or the switch enabling information.

The configuration information for monitoring a ratio of average throughputs of the data transmission includes: a time length of the evaluation performed by the UE; and the switch enabling information includes: whether the UE performs the evaluation.

After the UE reporting an evaluation result, the method further includes: the source control entity of the RAN or the CN receiving the evaluation result; and the source control entity of the RAN or the CN sending the evaluation result to a target control entity of current handover or a Mobility Management Entity MME.

After the source control entity of the RAN or the CN sending the evaluation result to a target control entity of current handover or an MME, the method further includes: the target control entity or the MME determining a resource pre-configuration policy according to the evaluation result.

According to another embodiment of the present document, the present document provides an evaluation result acquisition method, including: a source control entity of a Radio Access Network RAN or a Core Network CN sending configuration information for monitoring a ratio of average throughputs of data transmission and/or switch enabling information to UE through a downlink message, herein the configuration information and/or the switch enabling information is used for the UE to perform an evaluation on a relation between throughputs of the data transmission at a Wireless Local Area Network WLAN Access Point AP and a source serving cell; and the source control entity of the RAN or the CN receiving an evaluation result.

After the source control entity of the RAN or the CN receiving an evaluation result, the method further includes: the source control entity of the RAN or the CN sending the evaluation result to a target control entity of current handover or a Mobility Management Entity MME.

According to another embodiment of the present document, the present document further provides an evaluation result acquisition method, including: a target control entity or a Mobility Management Entity MME receiving an evaluation result of an evaluation performed by UE on a relation between throughputs of data transmission at a Wireless Local Area Network WLAN Access Point AP and a source serving cell; and the target control entity or the MME determining a resource pre-configuration policy according to the evaluation result.

According to another embodiment of the present document, the present document provides an evaluation result reporting device located in UE, including: an evaluation module configured to perform an evaluation on a relation between throughputs of data transmission at a Wireless Local Area Network WLAN Access Point AP and a source serving cell; and a reporting module configured to report an evaluation result.

According to another embodiment of the present document, the present document further provides an evaluation result acquisition device located in a source control entity of a Radio Access Network RAN or a Core Network CN, including: a sending module configured to send configuration information for monitoring a ratio of average throughputs of data transmission and/or switch enabling information to UE through a downlink message, herein the configuration information and/or the switch enabling information is used for the UE to perform an evaluation on a relation between throughputs of the data transmission at a Wireless Local Area Network WLAN Access Point AP and a source serving cell; and a first receiving module configured to receive an evaluation result.

According to another embodiment of the present document, the present document further provides an evaluation result acquisition device located in a target control entity or a Mobility Management Entity MME, including: a second receiving module configured to receive an evaluation result of an evaluation performed by UE on a relation between throughputs of data transmission at a Wireless Local Area Network WLAN Access Point AP and a source serving cell; and a determination module configured to determine a resource pre-configuration policy according to the evaluation result.

According to another embodiment of the present document, the present document provides an evaluation result acquisition system, including the evaluation result reporting device and further including the two evaluation result acquisition devices.

According to the embodiments of present document, UE performs an evaluation on a relation between throughputs of data transmission at a WLAN AP and a source serving cell; and the UE reports an evaluation result. By using the method, the problem that a WLAN-side data flow offloading state and a situation of transmission experience of the UE cannot be obtained in a moving process of the UE in the related art is solved. Thereby the reasonable resource pre-configuration can be performed for the moving process of the UE, the resource allocation and utilization efficiency are improved, and the user experience is enhanced.

BRIEF DESCRIPTION OF DRAWINGS

The drawings described here are used for providing further understanding about the present document, and constitute a part of the present application. The exemplary embodiments of the present document and the description thereof are used for explaining the present document instead of improperly limiting the present document. In the drawings.

SPECIFIC EMBODIMENTS

The present document will be described below in detail with reference to the drawings in combination with the embodiments. It needs to be noted that the embodiments in the present document and the features in the embodiments may be mutually combined under the situation of no conflict.

Aiming at the above-mentioned problem, the embodiment provides a method and a logic system for WLAN side concurrent transmission throughput in a process that UE moves in a 3GPP system. In order to simplify the description of the content, the control and feedback interaction between the UE and an RAN at an Access Stratum AS will be empathetically described. However, the interaction between the UE and a Core Network CN at a Non Access Stratum NAS is substantively similar, i.e., control coming from a network side and feedback information coming from a UE side are transmitted depending on an air interface and a terrestrial interface. In addition, the concept may be widely applied to any current systems in 3GPP family and WLAN and future long term evolution systems thereof, such as Future Radio Access, 5G and HEW and so on.

Figure 4:
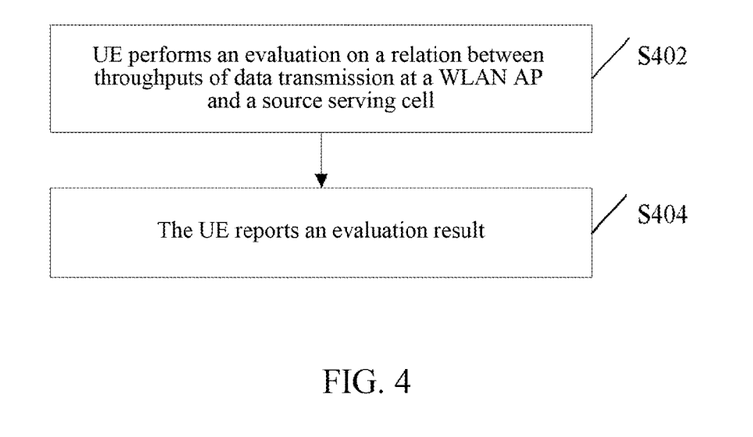
FIG. 4 illustrates a flowchart of an evaluation result reporting method according to an embodiment of the present document.

In the embodiment, an evaluation result reporting method is provided. FIG. 4 illustrates a flowchart of an evaluation result reporting method according to an embodiment of the present document. As illustrated in FIG. 4, the method includes the following steps:

In step S402, UE performs an evaluation on a relation between throughputs of data transmission at a WLAN AP and a source serving cell.

In step S404, the UE reports an evaluation result.

In the embodiment, through the above-mentioned steps, the UE reports the relation between throughputs of data transmission at the WLAN AP and the source serving cell, such that the source serving cell and a target serving cell can obtain the relation between throughputs of data transmission of the UE at the WLAN AP and the source serving cell in a moving process of the UE, the problem that a WLAN-side data flow offloading state and a situation of transmission experience of the UE cannot be obtained in the moving process of the UE in the related art is solved. Therefore, the reasonable resource pre-configuration can be performed for the moving process of the UE, the resource allocation and utilization efficiency are improved, and the user experience is enhanced.

As an alternative implementation mode, the specific content that the UE performs the evaluation on the relation between throughputs of data transmission at the WLAN AP and the source serving cell may include: the UE performs an evaluation on a ratio of average throughputs of data transmission at the WLAN AP and the source serving cell; or the UE may also perform an evaluation on a change trend of the average throughput of data transmission at the WLAN AP.

Alternatively, the UE may perform the evaluation on the relation between throughputs of data transmission at the WLAN AP and the source serving cell according to a requirement of a source control entity of an RAN or a CN. For example, the UE may receive configuration information for monitoring a ratio of average throughputs of data transmission and/or switch enabling information sent by the source control entity of the RAN or the CN through a downlink message, and then the UE performs the evaluation on the relation between throughputs of data transmission at the WLAN AP and the source serving cell according to the configuration information and/or switch enabling information.

Alternatively, the configuration information for monitoring the ratio of average throughputs of data transmission may include a time length of the evaluation performed by the UE. The time length may be the actual time length of the evaluation which is performed, and may also be the maximum time length of the evaluation which is performed, e.g., although the time length of the evaluation is set according to the configuration information, an evaluation process may also be interrupted. The switch enabling information may include whether the UE performs the evaluation.

Alternatively, after the UE reports the evaluation result, the source control entity of the RAN or the CN receives the evaluation result, and may send the evaluation result to a target control entity of current handover or an MME.

Alternatively, after obtaining the evaluation result, the target control entity or the MME may determine a resource pre-configuration policy according to the evaluation result.

Figure 5:
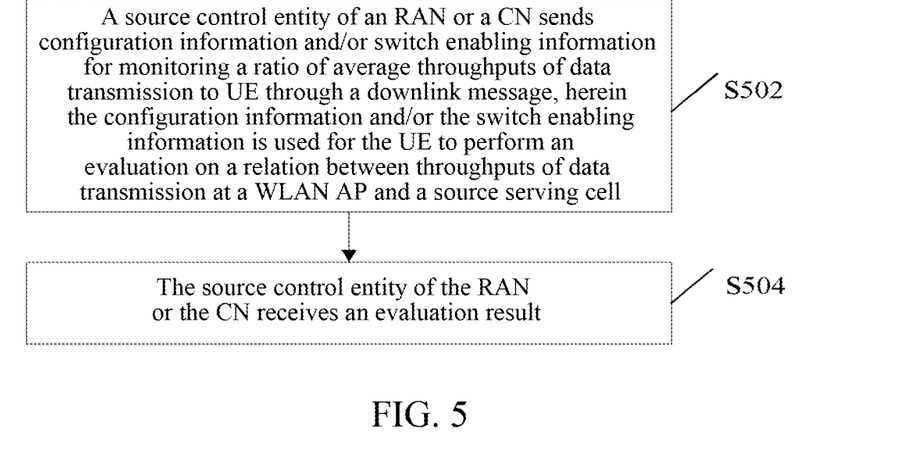
FIG. 5 illustrates a flowchart of an evaluation result acquisition method according to an embodiment of the present document.

In the embodiment, an evaluation result acquisition method is further provided. FIG. 5 illustrates a flowchart of an evaluation result acquisition method according to the embodiment of the present document. As illustrated in FIG. 5, the method includes the following steps:

In step S502, a source control entity of an RAN or a CN sends configuration information for monitoring a ratio of average throughputs of data transmission and/or switch enabling information to UE through a downlink message, herein the configuration information and/or the switch enabling information is used for the UE to perform an evaluation on a relation between throughputs of data transmission at WLAN AP and a source serving cell.

In step S504, the source control entity of the RAN or the CN receives an evaluation result.

In the embodiment, through the above-mentioned steps, the UE performs the evaluation on the relation between throughputs of data transmission at the WLAN AP and the source serving cell according to the configuration information for monitoring the ratio of average throughputs of data transmission and/or switch enabling information, which is sent by the source control entity of the RAN or the CN to the UE through the downlink message, and sends the evaluation result to the source control entity of the RAN or the CN. Therefore, the source serving cell and a target serving cell can obtain the relation between throughputs of data transmission of the UE at the WLAN AP and the source serving cell in a moving process of the UE, the problem that a WLAN-side data flow offloading state and a situation of transmission experience of the UE cannot be obtained in the moving process of the UE in the related art is solved. Consequently, the reasonable resource pre-configuration can be performed for the moving process of the UE, the resource allocation and utilization efficiency are improved, and the user experience is enhanced.

Alternatively, after receiving the evaluation result, the source control entity of the RAN or the CN may send the evaluation result to a target control entity of current handover or an MME.

Figure 6:
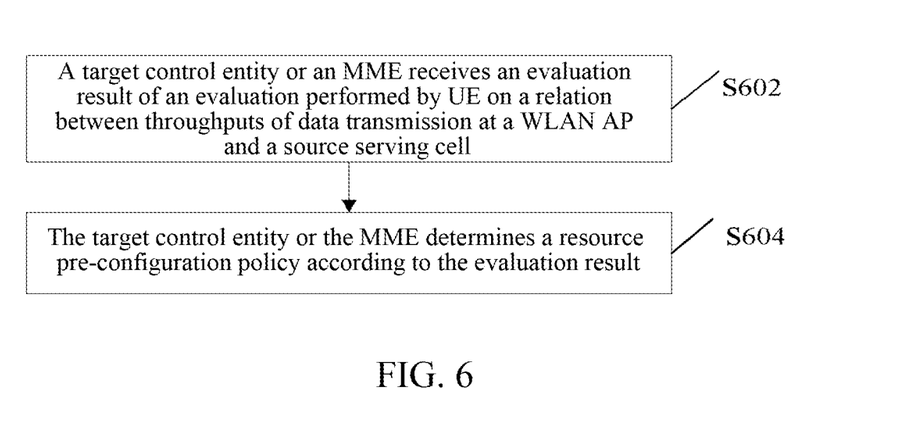
FIG. 6 illustrates a flowchart of another evaluation result acquisition method according to an embodiment of the present document.

In the embodiment, another evaluation result acquisition method is further provided. FIG. 6 illustrates a flowchart of another evaluation result acquisition method according to an embodiment of the present document. As illustrated in FIG. 6, the method includes the following steps:

In step S602, a target control entity or an MME receives an evaluation result of an evaluation performed by UE on a relation between throughputs of data transmission at a WLAN AP and a source serving cell.

In step S604, the target control entity or the MME determines a resource pre-configuration policy according to the evaluation result.

In the embodiment, through the above-mentioned steps, the target control entity or the MME obtains the evaluation result of the evaluation performed by the UE on the relation between throughputs of data transmission at the WLAN AP and the source serving cell, and determines the policy pre-configuration policy according to the evaluation result. Therefore, the source serving cell and a target serving cell can obtain the relation between throughputs of data transmission of the UE at the WLAN AP and the source serving cell in a moving process of the UE, the problem that a WLAN-side data flow offloading state and a situation of transmission experience of the UE cannot be obtained in the moving process of the UE in the related art is solved. Consequently, the resource allocation and utilization efficiency are improved, and the user experience is enhanced.

Corresponding to the evaluation result reporting method, in the embodiment, an evaluation result reporting device located in UE is provided. The device is configured to implement the above-mentioned embodiments and the alternative implementation modes. Herein, what has already been described will not be repetitively described. As used below, the term "module" may implement a combination of software and/or hardware having a predetermined function. Although the device described in the embodiment below is better implemented by means of software, implementation by means of hardware or a combination of software and hardware may also be conceived.

Figure 7:
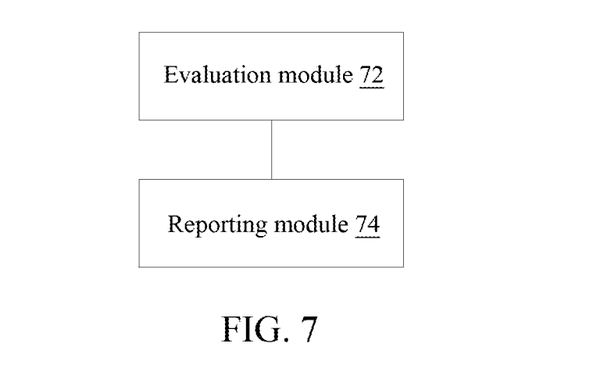
FIG. 7 illustrates a structural diagram of an evaluation result reporting device according to an embodiment of the present document.

FIG. 7 illustrates a structural diagram of an evaluation result reporting device according to an embodiment of the present document. As illustrated in FIG. 7, the device includes an evaluation module 72 and a reporting module 74. Each module will be described below in detail.

The evaluation module 72 is configured to perform an evaluation on a relation between throughputs of data transmission at WLAN AP and a source serving cell. The reporting module 74 is connected with the evaluation module 72, and is configured to report an evaluation result of the evaluation module 72.

Figure 8:
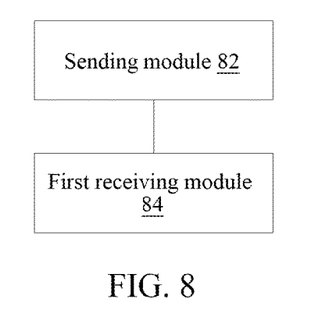
FIG. 8 illustrates a structural diagram of an evaluation result acquisition device according to an embodiment of the present document.

Corresponding to the first evaluation result acquisition method, in the embodiment, an evaluation result acquisition device located in a source control entity of an RAN or a CN is provided. FIG. 8 illustrates a structural diagram of an evaluation result acquisition device according to an embodiment of the present document. As illustrated in FIG. 8, the device includes a sending module 82 and a first receiving module 84. Each module will be described below in detail.

The sending module 82 is configured to send configuration information for monitoring a ratio of average throughputs of data transmission and/or switch enabling information to UE through a downlink message, herein the configuration information and/or the switch enabling information is used for the UE to perform an evaluation on a relation between throughputs of data transmission at a WLAN AP and a source serving cell. The first receiving module 84 is configured to receive an evaluation result.

Figure 9:
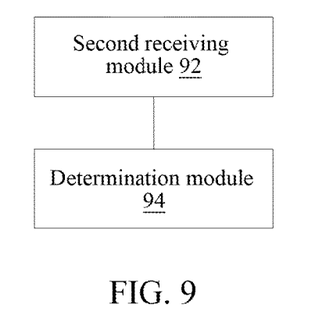
FIG. 9 illustrates a structural diagram of another evaluation result acquisition device according to an embodiment of the present document.

Corresponding to the another evaluation result acquisition method, in the embodiment another evaluation result acquisition device located in a target control entity or an MME is provided. FIG. 9 illustrates a structural diagram of another evaluation result acquisition device according to an embodiment of the present document. As illustrated in FIG. 9, the device includes a second receiving module 92 and a determination module 94. Each module will be described below in detail.

The second receiving module 92 is configured to receive an evaluation result of an evaluation performed by UE on a relation between throughputs of data transmission at a WLAN AP and a source serving cell. The determination module 94 is configured to determine a resource pre-configuration policy according to the evaluation result.

Figure 10:
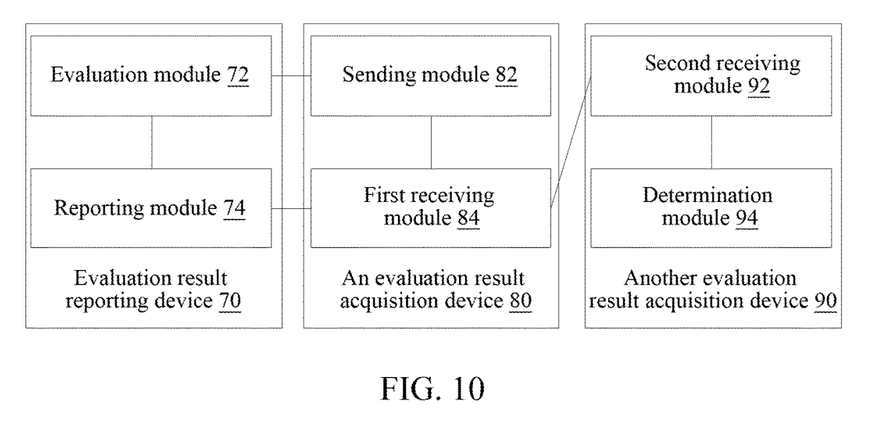
FIG. 10 illustrates a structural diagram of an evaluation result acquisition system according to an embodiment of the present document.

In the embodiment, an evaluation result acquisition system is further provided. FIG. 10 illustrates a structural diagram of an evaluation result acquisition system according to the embodiment of the present document. As illustrated in FIG. 10, the system includes an evaluation result reporting device 70 illustrated in FIG. 7, and further includes an evaluation result reporting device 80 illustrated in FIG. 8 and another evaluation result reporting device 90 illustrated in FIG. 9.

Description will be made below in combination with alternative embodiments, and the following alternative embodiments combine the above-mentioned embodiments and the alternative implementation modes thereof.

In the following alternative embodiments, a method and a logic system for coordinating WLAN-side concurrent transmission throughput in a process that UE moves in a 3GPP system are provided, which involve a cross-system interoperation coupling relation between a long term evolution communication system in a 3GPP family (including a network side and a UE side), a WLAN radio local area system (including a network side and a UE side) and future long term evolution systems thereof such as High Efficient WLAN HEW.

Figure 11:
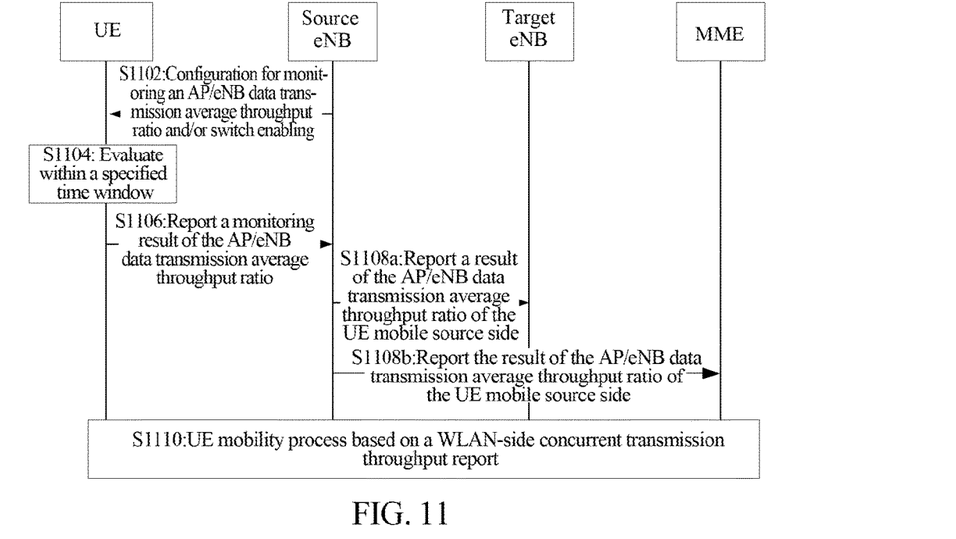
FIG. 11 illustrates a flowchart of a method for concurrent transmission throughput of a wireless local area network side in a process that a UE moves in a 3GPP system according to an alternative embodiment of the present document.

FIG. 11 illustrates a flowchart of a method for coordinating wireless local area network side concurrent transmission throughput in a process that a UE moves in a 3GPP system according to alternative embodiments of the present document. As illustrated in FIG. 11, main steps involved in the method of the following alternative embodiments are as follows:

In step S1100 (not shown), as an initial precondition, a network side RAN or a CN of a 3GPP system and UE can simultaneously support the content of the method. If the capability is not mandatory at a UE side, a UE may notify the network side about whether the UE has a capability of supporting the method through direct or indirect capability indication information.

In step S1102, a source control entity of the RAN or the CN (in order to simplify the description of the method, the source control entity is represented by using a source eNB in an LTE system in FIG. 11 and however is not limited to the source eNB) transmits related configuration information for monitoring a ratio of average throughputs of data transmission at a WLAN AP and the source eNB and/or switch enabling information AP/eNB_Throughput_Monitor_Configuration_Info to the UE which supports the capability through a downlink message. Herein, the information may include:

(1) an enabler for the UE to perform monitoring and reporting of the ratio of average throughputs of data transmission at the WLAN AP and the source eNB, i.e., AP/eNB_Throughput_Monitor_Report_Enabled, a value of which, for example, is: {Enabled, Disabled};

(2) an evaluation timer for the UE to perform monitoring on the ratio of average throughputs of data transmission at the WLAN AP and the source eNB, i.e., AP/eNB_Throughput_Monitor_Evaluation_Timer, a value of which, for example, is: {10 s, 30 s, 60 s, . . . }.

In step S1104, the UE receives the downlink message according to the 3GPP related art, parses out related configuration information (if carried by the message) and makes the following understanding and action:

If AP/eNB_Throughput_Monitor_Report_Enabled=Enabled, it represents that the UE starts to perform monitoring on the ratio of average throughputs of data transmission at the related AP and the source eNB and an evaluation of a change trend of average throughput of data transmission at an AP side. Otherwise, the UE does not perform or stops performing related monitoring and evaluation. A value of AP/eNB_Throughput_Monitor_Evaluation_Timer represents maximum time window length for the UE to perform related evaluation. If the evaluation is stopped, an evaluation result obtained at a moment when the evaluation is stopped is still used as an effective reference. If AP/eNB_Throughput_Monitor_Evaluation_Timer is not configured, related evaluation is performed according to a system default value. Here, the UE may perform monitoring on the ratio of average throughputs of data transmission at the AP and the source eNB and the evaluation of the change trend of average throughput of data transmission at the AP side by adopting any implementation mechanism inside the UE. A reference may also be made to an Enhanced Minimize Driving Test eMDT and 3GPP specification definitions related to throughput measurement in an Enhanced Minimize Driving Test.

In step S1106, the UE feeds a result of the evaluation back to the source side RAN or CN (source eNB) through an uplink message in an applicable RRC state. The UE may use a dedicated message (which is used for immediately and specially reporting the evaluation result after the related evaluation is completed) or a channel associated message (it is to wait for another uplink message that is triggered to be sent, so that the evaluation result will be associated with the uplink message to be reported instead of immediately and specially reporting the evaluation result after the related evaluation is completed). The evaluation result may include:

(1) A quantized value of a ratio of average throughputs of downlink data transmission of the UE at the WLAN AP and the source eNB, i.e., AP/eNB_DL_Throughput_Ratio, a value of which, for example, is: {0, 20%, 50%, 100%, 200% . . . }.

(2) A quantized value of a ratio of average throughputs of uplink data transmission of the UE at the WLAN AP and the source eNB, i.e., AP/eNB_UL_Throughput_Ratio, a value of which, for example, is: {0, 20%, 50%, 100%, 200% . . . }.

(3) A change trend of average throughput of downlink data transmission of the UE at the WLAN AP, i.e., AP_DL_Throughput_Trend, a value of which, for example, is: {AP_DL_Up, AP_DL_Hold, AP_DL_Down}.

(4) A change trend of average throughput of uplink data transmission of the UE at the WLAN AP, i.e., AP_UL_Throughput_Trend, a value of which, for example, is: {AP_UL_Up, AP_UL_Hold, AP_UL_Down}.

In step S1108a/b: at a moment when a mobility process of the UE in the 3GPP system is triggered, according to different UE mobility processes, the source eNB may transmit a related evaluation result to a target eNB directly through an X2 interface, and may also transmit the related evaluation result to an upstream MIME directly through an S1 interface.

In step S1110, after the target eNB or the MME receives the related evaluation information, transmitted by the source eNB, of average throughput of data transmission of the UE at the WLAN AP and the source eNB, the target eNB or the MME can know to a certain extent a situation of resources consumed by the UE at a WLAN side before a moving process and a situation of user throughput QOS experience. Therefore, a reference may be provided for the target eNB to better pre-configure corresponding resources. A basic step process of steps S1102-S1110 is as illustrated in FIG. 11.

Embodiment 1

Figure 12:
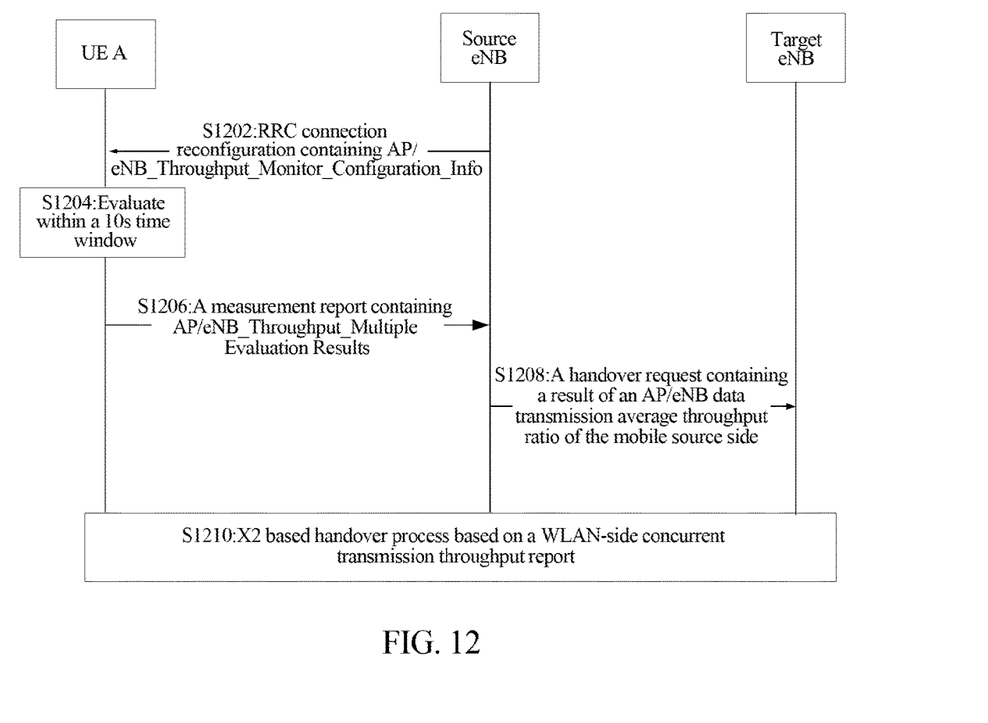
FIG. 12 illustrates a flowchart according to alternative embodiment 1 of the present document.

FIG. 12 illustrates a flowchart according to alternative embodiment 1 of the present document. Referring to FIG. 12, UE A having a capability of supporting the content of the method is simultaneously located at a cell edge of a source eNB and under the coverage of radio signals of a WLAN. The UE A is in an RRC_Connected mode in a source LTE cell and is making a VOLTE voice session, and at the same time, the source eNB migrates an IP service flow corresponding to a multimedia local downloading service of the UE A to the WLAN AP according to a WLAN network selection and flow offloading control mechanism thereof.

In step S1202, an eNB sends AP/eNB_Throughput_Monitor_Configuration_Info to the UE A through an RRC Connection Reconfiguration dedicated message. Herein a parameter configuration is as follow:

AP/eNB_Throughput_Monitor_Report_Enabled=Enabled;

AP/eNB_Throughput_Monitor_Evaluation_Timer=10 s;

The UE accepts the configuration, and prepares to perform a related evaluation on average throughput of data transmission thereof at the WLAN AP and the source eNB before a moving process.

In step S1204, the UE A starts an evaluation timer to perform the related evaluation on average throughput of data transmission thereof at the WLAN AP and the source eNB before the moving process. For example, through an internal implementation technology, an AP/eNB data transmission average throughput ratio is defined as a ratio of total amount of data transmitted within an effective statistic time window to statistic time, and a change trend of average throughput at the AP side is a comparison between throughput at a second half period of the statistic time window and throughput at a first half period of the statistic time window. If the timer=10 s, the UE A stops the evaluation and stores a related evaluation result.

In step S1206, after 10 s, the UE A is still in the RRC_Connected mode, internal Radio Resource Management (RRM) measurement triggers a handover event EA3, and thus the UE A reports the related evaluation result through a measurement report dedicated message associated with a channel, herein:

AP/eNB_DL_Throughput_Ratio=200%;

AP/eNB_UL_Throughput_Ratio=20%;

AP_DL_Throughput_Trend=AP_DL_Down;

AP_UL_Throughput_Trend=AP_UL_Hold.

In Step S1208, since the source eNB decides to execute an X2 based handover process, the source eNB sends a handover request message to a target eNB through an X2 terrestrial interface, herein the handover request message contains evaluation information of the AP/eNB throughput ratio and the AP throughput change trend in addition to handover request preparation information necessary for a current normal handover process.

In step S1210, after the target eNB receives the related evaluation information, transmitted by the source eNB, of average throughput of data transmission of the UE at the WLAN AP and the source eNB, the target eNB knows a situation of resources consumed by the UE at a WLAN side before a cross-eNB handover process and user throughput experience to a certain extent. Thus a reference may be provided for the target eNB to better pre-configure corresponding resources, e.g., specific additional resource information is contained in a handover request ACK message responding to the source eNB.

Embodiment 2

Figure 13:
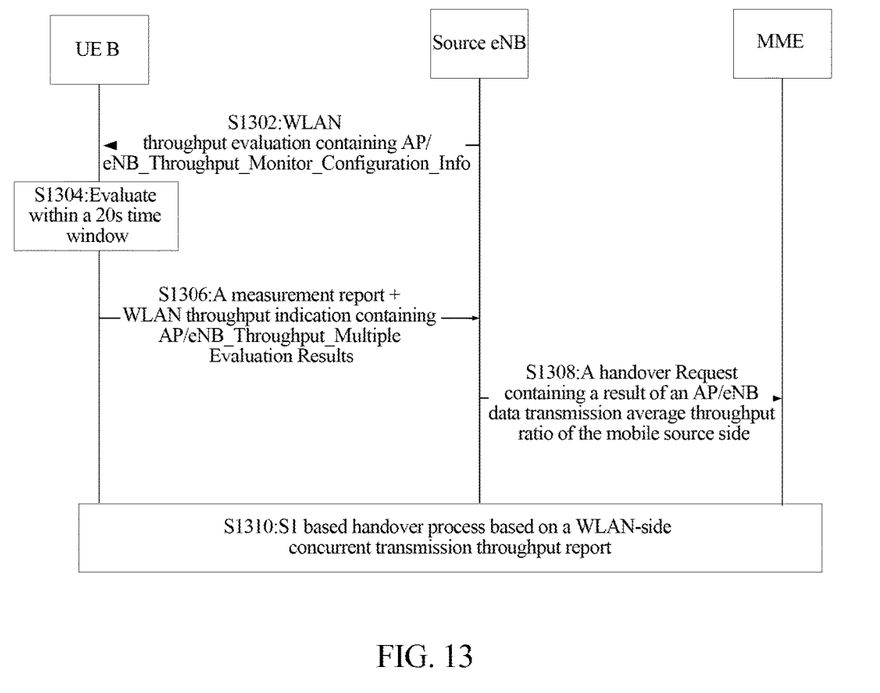
FIG. 13 illustrates a flowchart according to alternative embodiment 2 of the present document.

FIG. 13 illustrates a flowchart according to alternative embodiment 2 of the present document. Referring to FIG. 13, UE B having a capability of supporting the content of the method is simultaneously located under the coverage of radio signals of LTE and WLAN. The UE B is in an RRC_Connected mode at the cell edge of LTE, and is performing an uploading service of a plurality of local files. The eNB migrates partial uploading IP service flow to the WLAN AP according to a WLAN network selection and flow offloading control mechanism thereof.

In step S1302, an eNB sends AP/eNB_Throughput_Monitor_Configuration_Info to the UE B through a newly introduced WLAN throughout evaluation dedicated message. Herein, a parameter configuration is as follow:

AP/eNB_Throughput_Monitor_Report_Enabled=Enabled;

AP/eNB_Throughput_Monitor_Evaluation_Timer=30 s;

the UE B accepts the configuration, and prepares to perform a related evaluation on average throughput of data transmission thereof at the WLAN AP and the source eNB before a moving process.

In step S1304, the UE B starts an evaluation timer to perform the related evaluation on average throughput of data transmission thereof at the WLAN AP and the source eNB before the moving process. For example, through an internal implementation technology, an AP/eNB data transmission average throughput ratio is defined as total amount of data transmitted per second, and a change trend of average throughput at the AP side is a comparison between average transmission throughput at the last one second and average transmission throughput at the previous one second within an effective statistic time window. If the timer=30 s, the UE B stops the evaluation and stores a related evaluation result.

In step S1306, after 20 s, the UE B is still in the RRC_Connected mode, internal Radio Resource Management RRM measurement triggers a handover event EA3, the UE B must finish the WLAN/eNB related evaluation in advance and reports the related evaluation result through a newly introduced WLAN throughput indication dedicated message. At the same time the UE B reports a measurement report dedicated message as usual to trigger a handover process, herein:

AP/eNB_DL_Throughput_Ratio=20%;

AP/eNB_UL_Throughput_Ratio=100%;

AP_DL_Throughput_Trend=AP_DL_Hold;

AP_UL_Throughput_Trend=AP_UL_Down.

In step S1308, since the source eNB decides to execute an S1 based handover process, the eNB sends a handover required message to an MIME through an S1 terrestrial interface, herein the handover required message contains evaluation information of the AP/eNB throughput ratio and the AP throughput change trend in addition to handover request preparation information necessary for a current normal handover process.

In step S1310, after the MME receives the related evaluation information, transmitted by the source eNB, of average throughput of data transmission of the UE at the WLAN AP and the source eNB, the MME knows a situation of resources consumed by the UE at a WLAN side before a cross-eNB handover process and user throughput experience to a certain extent. Thus, a reference may be provided for the target eNB to better pre-configure corresponding resources, e.g., specific additional resource information is contained in a handover command message returned to the source eNB.

Embodiment 3

Figure 14:
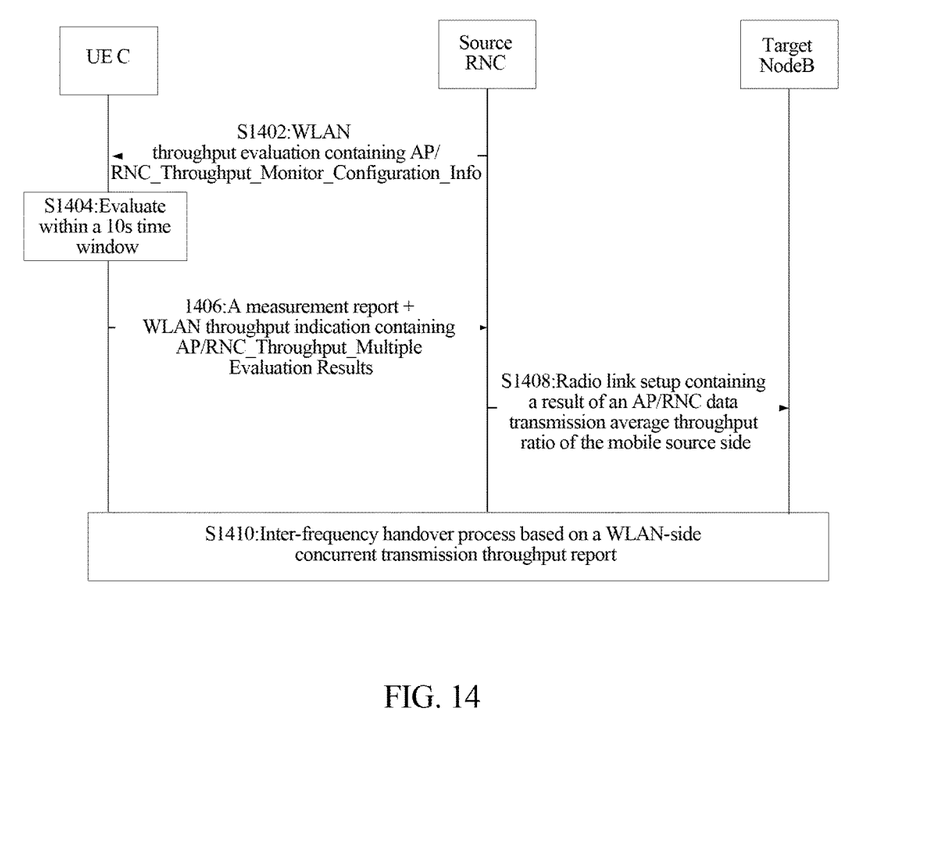
FIG. 14 illustrates a flowchart according to alternative embodiment 3 of the present document.

FIG. 14 illustrates a flowchart according to alternative embodiment 3 of the present document. Referring to FIG. 14, UE C having a capability of supporting the content of the method is simultaneously located at a cell edge of a source UMTS NodeB and under the coverage of radio signals of a WLAN. The UE C is in a Cell_DCH state in a UMTS cell, is making a CS voice session and at the same time starts an online video viewing service. A network side migrates an IP service flow bearing a video to a WLAN system according to a WLAN network selection and flow offloading control mechanism thereof.

In step S1402, an RNC sends AP/RNC_Throughput_Monitor_Configuration_Info to the UE C through a newly introduced WLAN throughput evaluation dedicated message. Herein, a parameter configuration is as follow:

AP/RNC_Throughput_Monitor_Report_Enabled=Enabled;

AP/RNC_Throughput_Monitor_Evaluation_Timer=30 s;

the UE C accepts the configuration, and prepares to perform a related evaluation on average throughput of data transmission thereof at the WLAN AP and the source NodeB before a moving process.

In step S1404, the UE C starts an evaluation timer to perform the related evaluation on average throughput of data transmission thereof at the WLAN AP and the source NodeB before the moving process. For example, through an internal implementation technology, an AP/RNC data transmission average throughput ratio is defined as total amount of data transmitted per second, and a change trend of average throughput at the AP side is a comparison between throughput at the last two seconds and throughput at the previous two seconds within an effective statistic time window. If the timer=30 s, the UE C stops the evaluation and stores a related evaluation result.

In step S1406, after 10 s, the UE C is still in the Cell_DCH state, internal Radio Resource Management (RRM) measurement triggers a handover event b1, the UE C must finish the WLAN/RNC related evaluation in advance, and reports the related evaluation result through a newly introduced WLAN throughput indication dedicated message. At the same time the UE C reports a measurement report dedicated message as usual to trigger an inter-frequency handover process, herein:

AP/RNC_DL_Throughput_Ratio=100%;

AP/RNC_UL_Throughput_Ratio=50%;

AP_DL_Throughput_Trend=AP_DL_Up;

AP_UL_Throughput_Trend=AP_UL_Up.

In step S1408, since the source RNC decides to execute the inter-frequency handover process, the source RNC sends a Radio Link Setup message to a target NodeB through an Iub terrestrial interface, herein the radio link setup message contains evaluation information of the AP/RNC throughput ratio and the AP throughput change trend in addition to information necessary for a current normal handover process.

In step S1410, after the target NodeB receives the related evaluation information, transmitted by the source RNC, of average throughput of data transmission of the UE at the WLAN AP and the source NodeB, the target NodeB knows a situation of resources consumed by the UE at a WLAN side before a cross-NodeB handover process and user throughput experience to a certain extent. Thus, a reference may be provided for the target NodeB to use corresponding resources.

In another embodiment, software is further provided, and the software is configured to execute the technical solutions described in the above-mentioned embodiments and the alternative embodiments.

In another embodiment, a storage medium is further provided, the above-mentioned software is stored in the storage medium and the storage medium includes but not limited to a compact disk, a soft disk, a hard disk, an erasable memory, etc.

It will be apparent to one skilled in the art should understand that all modules and all steps of the present document may be implemented by using general-purpose computing devices, they may be integrated in a single computing device or distributed on a network consisting of a plurality of computing devices. Alternatively, they may be implemented by using program codes executable for computing devices, thus they may be stored in memory devices and executed by computing devices. The illustrated or described steps may be executed according to a sequence different from the sequence here under certain circumstances, or they may be respectively manufactured into integrated circuit modules or a plurality of modules or steps thereof may be manufactured into a single integrated circuit module to implement. Therefore, the present document is not limited to any specific combination of hardware and software.

The embodiments described above are just alternative embodiments of the present document and are not used for limiting the present document. For one skilled in the art, the present document may have various modifications and variations. Any modification, equivalent replacement, improvement and the like made within the essence and rule of the present document shall be still included in the protection scope of the present document.

INDUSTRIAL APPLICABILITY

As described above, the evaluation result reporting method and the evaluation result acquisition method, device and system provided by the embodiments of the present document have the following beneficial effects: the problem that a WLAN-side data flow offloading state and a situation of transmission experience of the UE cannot be obtained in a moving process of the UE in the related art is solved, thereby the reasonable resource pre-configuration can be performed for the moving process of the UE, the resource allocation and utilization efficiency are improved, and the user experience is enhanced.

I claim:

1. An evaluation result reporting method, comprising:
    User Equipment (UE) performing an evaluation on a relation between throughputs of data transmission at a Wireless Local Area Network (WLAN) Access Point (AP) and a source serving cell;
    the UE reporting a result of the evaluation;
    a source control entity of a Radio Access Network (RAN) or a Core Network (CN) receiving the result of the evaluation performed by the UE on the relation between the throughputs of the data transmission at the WLAN AP and the source serving cell;
    the source control entity of the RAN or the CN sending the result of the evaluation to a target control entity of current handover or a Mobility Management Entity (MME); and
    the target control entity or the MME determining a resource pre-configuration policy according to the result of the evaluation performed by the UE on the relation between the throughputs of the data transmission at the WLAN AP and the source serving cell.

2. The method according to claim 1, wherein said UE performing an evaluation on a relation between throughputs of data transmission at a WLAN AP and a source serving cell comprises:
    the UE performing an evaluation on a ratio of average throughputs of the data transmission at the WLAN AP and the source serving cell; and
    the UE performing an evaluation on a change trend of the average throughput of the data transmission at the WLAN AP.

3. The method according to claim 1, wherein said UE performing an evaluation on a relation between throughputs of data transmission at a WLAN AP and a source serving cell comprises:
    the UE receiving configuration information for monitoring a ratio of average throughputs of the data transmission and/or switch enabling information, which is sent by the source control entity of the RAN or flail the CN through a downlink message; and
    the UE performing the evaluation on the relation between the throughputs of the data transmission at the WLAN AP and the source serving cell according to the configuration information and/or the switch enabling information.

4. The method according to claim 3, wherein,
    the configuration information for monitoring a ratio of average throughputs of the data transmission comprises: a time length of the evaluation performed by the UE; and
    the switch enabling information comprises: whether the UE performs the evaluation.

5. An evaluation result acquisition method, comprising:
    a source control entity of a Radio Access Network (RAN) or a Core Network (CN) sending configuration information for monitoring a ratio of average throughputs of data transmission and/or switch enabling information to User Equipment (UE) through a downlink message, wherein the configuration information and/or the switch enabling information is used for the UE to perform an evaluation on a relation between throughputs of the data transmission at a Wireless Local Area Network (WLAN) Access Point (AP) and a source serving cell; and the source control entity of the RAN or the CN receiving a result of the evaluation performed by the UE on the relation between the throughputs of the data transmission at the WLAN AP and the source serving cell; and the source control entity of the RAN or the CN sending the result of the evaluation to a target control entity of current handover or a Mobility Management Entity (MME) for the target control entity or the MME to determine a resource pre-configuration policy according to the result of the evaluation performed by the UE on the relation between the throughputs of the data transmission at the WLAN AP and the source serving cell.

6. An evaluation result acquisition method, comprising:
a target control entity or a Mobility Management Entity (MME) receiving, from a source control entity of a Radio Access Network (RAN) or a Core Network (CN), an evaluation a result of an evaluation performed by User Equipment (UE) on a relation between throughputs of data transmission at a Wireless Local Area Network (WLAN) Access Point (AP) and a source serving cell; and the target control entity or the MME determining a resource pre-configuration policy according to the result of the evaluation performed by the UE on the relation between the throughputs of the data transmission at the WLAN AP and the source serving cell.

7. An evaluation result reporting device located in UE, comprising a computing device and a memory device, wherein the memory device stores program codes that are executable by the computing device, and when the program codes are executed by the computing device, the following steps are performed:
performing an evaluation on a relation between throughputs of data transmission at a Wireless Local Area Network (WLAN) Access Point (AP) and a source serving cell; and reporting a result of the evaluation;

wherein the result of the evaluation is received by a source control entity of a Radio Access Network (RAN) or a Core Network (CN), the source control entity of the RAN or the CN sends the result of the evaluation to a target control entity of current handover or a Mobility Management Entity (MME), and the target control entity or the MME determines a resource pre-configuration policy according to the result of the evaluation performed by the UE on the relation between the throughputs of the data transmission at the WLAN AP and the source serving cell.

8. An evaluation result acquisition device located in a source control entity of a Radio Access Network (RAN) or a Core Network (CN), comprising a computing device and a memory device, wherein the memory device stores program codes that are executable by the computing device, and when the program codes are executed by the computing device, the following steps are performed:
sending configuration information for monitoring a ratio of average throughputs of data transmission and/or switch enabling information to User Equipment (UE) through a downlink message, wherein the configuration information and/or the switch enabling information is used for the UE to perform an evaluation on a relation between throughputs of the data transmission at a Wireless Local Area Network (WLAN) Access Point (AP) and a source serving cell; and receiving a result of the evaluation performed by the UE on the relation between the throughputs of the data transmission at the WLAN AP and the source serving cell; and sending the result of the evaluation to a target control entity of current handover or a Mobility Management Entity (MME) for the target control entity or the MME to determine a resource pre-configuration policy according to the result of the evaluation performed by the UE on the relation between the throughputs of the data transmission at the WLAN AP and the source serving cell.

9. An evaluation result acquisition device located in a target control entity or a Mobility Management Entity MME, comprising a computing device and a memory device, wherein the memory device stores program codes that are executable by the computing device, and when the program codes are executed by the computing device, the following steps are performed:
receiving, from a source control entity of a Radio Access Network (RAN) or a Core Network (CN), a result of an evaluation performed by User Equipment (UE) on a relation between throughputs of data transmission at a Wireless Local Area Network (WLAN) Access Point (AP) and a source serving cell; and determining a resource pre-configuration policy according to the result of the evaluation performed by the UE on the relation between the throughputs of the data transmission at the WLAN AP and the source serving cell.

10. An evaluation result acquisition system, comprising the evaluation result reporting device according to claim 7, and further comprising an evaluation result acquisition device located in a source control entity of a Radio Access Network RAN or a Core Network CN, comprising a computing device and a memory device, wherein the memory device stores program codes that are executable by the computing device, and when the program codes are executed by the computing device, the following steps are performed:
sending configuration information for monitoring a ratio of average throughputs of data transmission and/or switch enabling information to User Equipment (UE) through a downlink message, wherein the configuration information and/or the switch enabling information is used for the UE to perform an evaluation on a relation between throughputs of the data transmission at a Wireless Local Area Network (WLAN) Access Point (AP) and a source serving cell; and receiving a result of the evaluation;

and an evaluation result acquisition device located in a target control entity or a Mobility Management Entity MME, comprising a computing device and a memory device, wherein the memory device stores program codes that are executable by the computing device, and when the program codes are executed by the computing device, the following steps are performed:
receiving a result of an evaluation performed by UE on a relation between throughputs of data transmission at a Wireless Local Area Network (WLAN) Access Point (AP) and a source serving cell; and determining a resource pre-configuration policy according to the result of the evaluation.

* * * * *